Patented Apr. 5, 1932

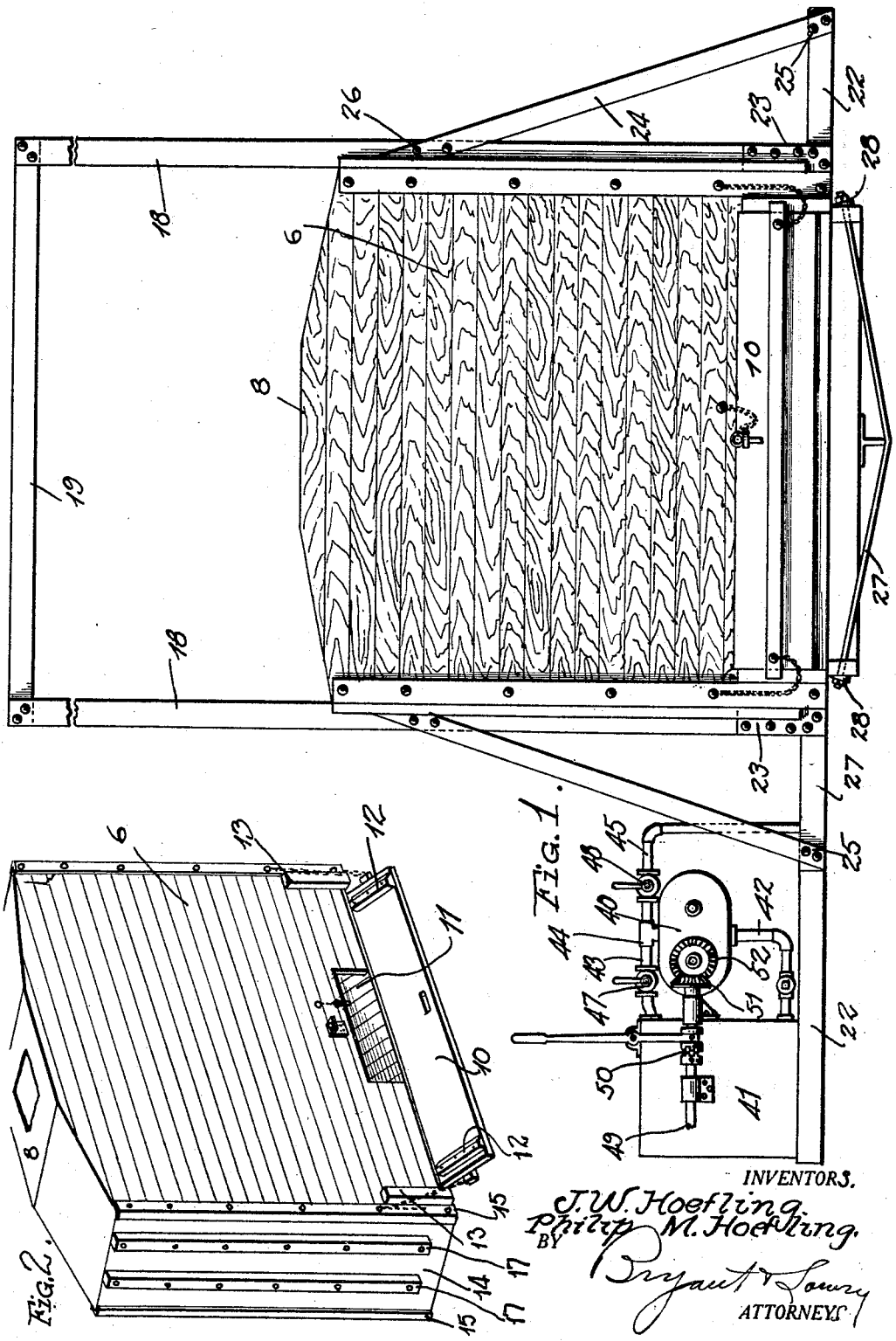

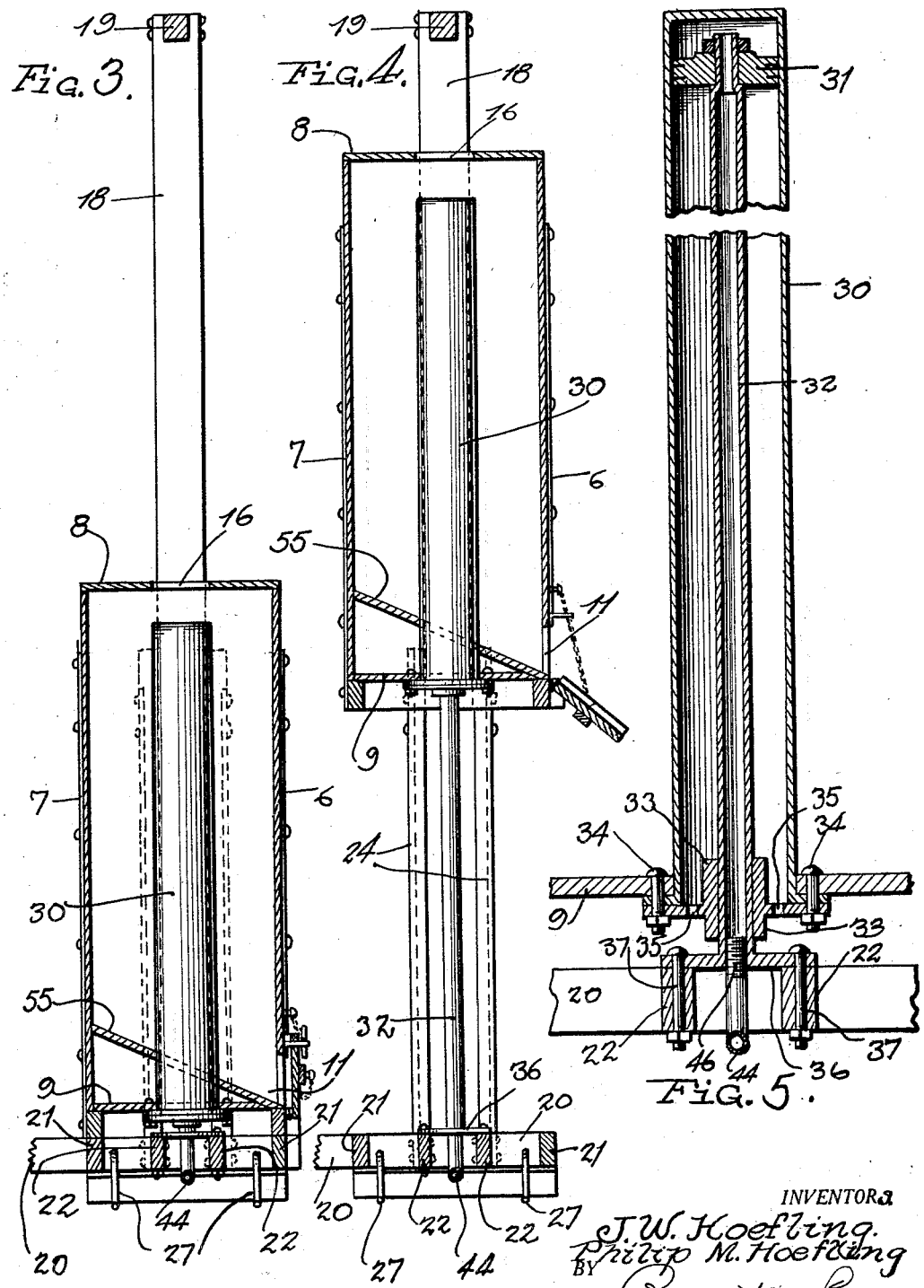

1,852,969

UNITED STATES PATENT OFFICE

JOHN W. HOEFLING AND PHILIP M. HOEFLING, OF CHICO, CALIFORNIA, ASSIGNORS TO HOEFLING BROS. INC., OF CHICO, CALIFORNIA, A CORPORATION OF CALIFORNIA

GRAVITY DISCHARGE GRAIN BIN FOR HARVESTERS

Application filed October 24, 1928. Serial No. 314,825.

This invention relates to auxiliary bins for harvesting machines, particularly the type employed in present day harvesting apparatus of the conventional form.

The primary object of this invention is to provide a device of the above mentioned character, which may be associated with a conventional form of harvesting machine, without necessitating changes in the structure or mechanical details of the same.

A further object of this invention is to provide a storage bin of a shape which will not cause distortion to the frame of the harvesting machine due to twisting and swaying caused by traveling over uneven and irregular ground.

A still further object of this invention is to provide a storage bin of the above mentioned character, adapted to be easily raised or lowered for loading and unloading purposes. The raising and lowering of the bin may be accomplished by hoisting mechanism associated therewith.

It has heretofore been common practice to provide a harvesting machine with an attachment similar to a trailer, but having only one wheel on one side thereof, while the other side of the wagon is supported by the harvester frame. Such constructions are usually mounted relatively high on the harvester creating a high center of gravity particularly when loaded. It will readily be seen that the height of this kind of attachment with load will cause the body frame of the harvester and its machinery to be impaired by swaying and rocking.

The above practice is objectionable because the center of gravity is so high that the swaying of the harvester frame caused by such an attachment traveling over uneven and irregular ground, cannot be prevented and the results are very serious.

The above difficulties and disadvantages are overcome by providing a relatively narrow bin placed low down and close in on the side of a harvester machine and supported entirely on the latter so that the same may pass through narrow gates without difficulty and without having to be removed from the harvester machine and so that the center of gravity of the bin is carried at as low a level as possible. When it is desired to unload the auxiliary bin the same may be quickly raised sufficiently high so that the contents thereof may flow freely by gravity into the truck or wagon for hauling from the field.

Other objects and advantages of the invention will become apparent during the course of the following description forming a part of this specification and in which Figure 1 is a side elevational view of the grain bin, showing the apparatus associated therewith for raising and lowering the same.

Figure 2 is a perspective view of the bin showing the cover for the spout or opening therefor.

Figure 3 is a vertical cross-sectional view through the bin showing the hydraulic hoist mounted therein for raising and lowering the bin. This figure shows the bin in its lowered position while being filled from the harvester machine.

Figure 4 is a vertical cross-sectional view showing the same arrangement of the hydraulic hoisting mechanism and showing the bin in position ready to be unloaded, and Figure 5 is a vertical cross-sectional view of the hoisting mechanism showing the construction and arrangement of the same.

For the purpose of illustration, attention is first directed to Figure 1, wherein is shown the auxiliary bin having a front wall 6, back wall 7, a top 8, and a bottom 9. The front wall 6 is provided with a hinged gate 10 for covering the opening 11 of the bin. The gate 10 is provided with transverse strips 12 adapted to seal the gate 10 against the side wall 6 of the auxiliary bin. Similar strips 13 are secured to the side wall 6 of the bin for further sealing the opening 11 when the gate 10 is closed.

The bin is also provided with side walls 14 braced by angle irons 15 secured to the vertical edges of the side walls 14, the front 6, and back wall 7.

An opening 16 may be formed in the top wall 8 of the bin for filling purposes, such as the grain spout from the harvester machine. The bin is provided with vertical guide members 17 secured to the side walls 14 for guiding the same in a vertical frame composed of vertical side bars 18 connected by a top bar 19 extending transversely of the vertical bars 18. The lowermost ends of the vertical bars 18 are secured to a frame structure including side bars 20 which may be connected to the side framework of the harvester machine and the framework also includes transverse bars 21 having their ends connected to the bars 20 and also bars 22 which also have their ends connected to the bars 20 and which extend outwardly from the framework 20. The lowermost ends of the vertical guide bars 18 are secured to the frame bars 20 by plates 23 or the like. The vertical guide bars 18 are braced by brace bars 24 having their lower ends connected as at 25 to the transverse bars 22 and their upper ends connected as at 26 to the vertical guide bars 18.

The framework 20 including the transverse bars 21 and 22 may be braced against strains by truss bars 27 having their ends 28 secured to the frame bars 20.

The hoisting apparatus includes a dash pot structure comprising a cylinder 30 secured to the lower wall 9 of the bin by bolts or the like and projecting inwardly and upwardly in respect thereto. A piston 31 is reciprocably mounted in the cylinder 30 and is provided with hollow connecting rod 32 which passes through a guide bearing 33 which is secured by bolts 34 to the bottom wall 9 of the bin. The cylinder 30 is also secured to the bottom of the bin 9 by the bolts 34. Breather holes 35 are placed around guide bearing 33. The connecting rod 32 is flanged as at 36 and is secured to the transverse bars 22 by fastening members 37.

Mechanism is provided for forcing fluid under pressure to the cylinder 30 and it includes a pump 40 connected to a reservoir 41 by a pipe 42. A pipe 43 connects the T-joint 44 of the pump 40. A pipe 45 connects the reservoir 41 to the connecting rod 32 as at 46. Valves 47 and 48 are connected in the pipes 43 and 45 for controlling the fluid under pressure to the dash pot structure.

The shaft 49 is connected to the harvester motor and is connected by a positive clutch 50 to the pump 40 through the medium of the bevel gear 51 and the pump gear 52.

A false bottom 55 may be provided in the auxiliary bin and it may be presented in such a manner as to allow its lower end to be in close relation to the opening 11 of the bin.

The fluid pressure apparatus including the tank 41 and pump 40 may be supported by the extensions 22 of the transverse bars 22 or the apparatus may be installed on a point on a harvester best situated for the power supply and for convenience of operation.

For a consideration of the operation of the device it will at this time be stated that the bin 6 may be filled from the harvester conveyor through the opening in the top thereof. After the bin has been loaded with grain, it is then raised vertically by the fluid pressure apparatus 40 and 41 through the medium of the dash pot structure 30 and is raised in such a manner as to bring the opening 11 of the bin 6 above the top of a truck or a wagon for unloading the bin 6 and the contents thereof into said truck or wagon.

It is to be understood that the illustrations shown in the drawings are merely for the purpose of setting forth the jist of the invention and that the operation of the bin in respect to the raising and lowering may be accomplished by other hoisting means common to the art, and it is also to be understood that various changes and arrangement of the parts may be resorted to without departing from the spirit of the invention or the scope of the subjoined claims.

What we claim is:—

1. In combination, a harvesting machine, a grain bin adapted to be vertically reciprocated, carried by the side of the harvesting machine, guide bars supported by the side of the harvesting machine for guiding the bin during its up and down movement, fluid pressure hoisting apparatus mounted inside of the bin and means for forcing fluid under pressure to the hoisting apparatus for effecting up and down movement of the grain bin.

2. In combination, a grain harvesting machine, a grain bin, adapted to be vertically movably attached low down to the side of the harvesting machine, said grain bin having a greater height than thickness, said grain bin also having openings for the inlet and outlet of the grain, a fluid operated hoisting device mounted within the grain bin, and fluid pressure operating means mounted on the grain harvesting machine for forcing fluid under pressure for raising the grain bin while being unloaded.

In testimony whereof we affix our signatures.

JOHN W. HOEFLING.
PHILIP M. HOEFLING.